(12) United States Patent
Ruiter (10) Patent No.: US 10,177,921 B2
(45) Date of Patent: Jan. 8, 2019

(54) SECURE LOGIN WITHOUT PASSWORDS (71) Applicant: XORkey B.V., Limmen (NL)

(72) Inventor: Timotheus Martinus Cornelis Ruiter, Heemskerk (NL)

(73) Assignee: XORkey B.V., Limmen (NL)

( * ) Notice: Subject to any disclaimer, the term of this patent is extended or adjusted under 35 U.S.C. 154(b) by 81 days.

(21) Appl. No.: 15/111,876

(22) PCT Filed: Jan. 15, 2015

(86) PCT No.: PCT/NL2015/050025
§ 371 (c)(1),
(2) Date: Jul. 15, 2016

(87) PCT Pub. No.: WO2015/108418
PCT Pub. Date: Jul. 23, 2015

(65) Prior Publication Data
US 2016/0337132 A1 Nov. 17, 2016

(30) Foreign Application Priority Data
Jan. 15, 2014 (WO) ................ PCT/NL2014/050017

(51) Int. Cl.
*H04L 9/32* (2006.01)
*G06F 21/31* (2013.01)
(Continued)

(52) U.S. Cl.
CPC ............ *H04L 9/3273* (2013.01); *G06F 21/31* (2013.01); *H04L 9/006* (2013.01); *H04L 9/14* (2013.01);
(Continued)

(58) Field of Classification Search
CPC ..................................................... H04L 9/3273
See application file for complete search history.

(56) References Cited

U.S. PATENT DOCUMENTS

| 2003/0056063 | A1* | 3/2003 | Hochmuth | .......... | H04L 63/0272 |
| | | | | | 711/152 |
| 2005/0055426 | A1* | 3/2005 | Smith | ............... | G06F 17/30902 |
| | | | | | 709/219 |

(Continued)

OTHER PUBLICATIONS

Appenzeller et al.; User-friendly access control for public network ports; Published in: IEEE INFOCOM '99. Conference on Computer Communications. Proceedings. Eighteenth Annual Joint Conference of the IEEE Computer and Communications Societies; Date of Conference: Mar. 21-25, 1999; IEEE Xplore (Year: 1999).*

(Continued)

*Primary Examiner* — Bradley Holder
(74) *Attorney, Agent, or Firm* — Lindsey A. Auerbach; Catherine A. Shultz; N.V. Nederlandsch Octrooibureau

(57) ABSTRACT

A process is disclosed for authorizing a user's access to a limited access network. The process comprises sending an encrypted server random number to a previously registered user. If the user can demonstrate an ability to successfully decrypt the server random number, the user is authenticated and access is authorized.

The process further comprises an encrypted user random number. Encryption of the user random number comprises the use of a server-controlled value. The web server's ability to return to the user a decryption of the encrypted user random number serves as confirmation that the web site is legitimate.

In a preferred embodiment all communications of login values between the user and the web server are encrypted. In an embodiment a user is provided with a key for encrypting user random numbers and for decrypting server random numbers. The key may be automatically updated on a predetermined schedule.

17 Claims, 1 Drawing Sheet

(51) Int. Cl.
*H04L 9/00* (2006.01)
*H04L 9/14* (2006.01)
*H04L 9/30* (2006.01)
*H04L 29/06* (2006.01)
*G06F 21/32* (2013.01)
*H04L 9/08* (2006.01)

(52) U.S. Cl.
CPC .............. *H04L 9/30* (2013.01); *H04L 9/3247* (2013.01); *H04L 9/3263* (2013.01); *H04L 9/3271* (2013.01); *H04L 63/06* (2013.01); *H04L 63/102* (2013.01); *G06F 21/32* (2013.01); *H04L 9/0863* (2013.01); *H04L 9/0866* (2013.01); *H04L 9/0869* (2013.01); *H04L 9/0877* (2013.01); *H04L 9/3234* (2013.01)

(56) References Cited

U.S. PATENT DOCUMENTS

2005/0289355 A1* 12/2005 Kitariev ........... G01R 31/31719
                                                                 713/182
2008/0168567 A1*  7/2008 Hahn ................ G06F 21/6236
                                                                 726/28
2009/0320115 A1* 12/2009 Dean ..................... H04L 63/105
                                                                 726/8
2010/0211796 A1*  8/2010 Gailey ................... G06F 21/31
                                                                 713/182

OTHER PUBLICATIONS

Patel et al.; Ticket based service access for the mobile user; Published in: Proceeding MobiCom '97 Proceedings of the 3rd annual ACM/IEEE international conference on Mobile computing and networking; 1997; pp. 223-233; ACM Digital Library (Year: 1997).*

T.M.C. Ruiter—"Secure Login without Passwords", Mar. 9, 2014.

Bellare et al.—"Entity Authentication and Key Distribution", D.R. Stinson (EA): Advances in Cryptology—Crypto 93, LNCS 773, pp. 232-249, 1994, © Springer-Verlag Berlin Heidelberg 1994.

Menezes et al.—Handbook of Applied Cryptography, p. 385-403, "Ch. 10—Identification and Entity Authentication", XP-002386305, (c) 1997 by CRC Press, Inc.

M. Satyanarayanan—"Integrating Security in a Large Distributed System"—ACM Transactions on Computer Systems, vol. 7, No. 3, Aug. 1989, p. 247-280.

* cited by examiner

SECURE LOGIN WITHOUT PASSWORDS

BACKGROUND OF THE INVENTION

1. Field of the Invention

The invention relates generally to a secure protocol for authorizing a user's access to a Limited access network or a local network.

2. Description of the Related Art

Prior art processes authorize access of a user to a restricted access network, such as a Limited access network or a local network, using a combination of two strings of characters. The first such string generally serves to identify the user, and may be referred to as a "user id", a "user name" or a similar term. The second string is generally referred to as a "password", a "pass code", a "personal identification number" or PIN, or some such term.

An account server associated with the restricted access network keeps a lookup table of registered combinations of first strings and second strings. A user presenting a registered combination of a first string (hereinafter referred to as UserID) and a second string (hereinafter referred to as password") is provided access to the restricted access network. The UserID is generally left unchanged during the lifetime of an account. The password is supposed to be changed frequently, but this practice is experienced as cumbersome and often neglected.

The existing systems are attractive for unauthorized entry attempts, such as hacking. For example, a user may use identical UserID and password combinations for a number of different limited access networks. If only one becomes compromised, a whole number of that user's limited access accounts may be open to unauthorized access. Many users choose UserIDs and passwords that are easy to guess. Even if users choose more or less random strings to make guessing difficult, they are tempted to use short strings that are increasingly vulnerable to cracking by brute force computing. And, as mentioned earlier, most users do not follow the advice of frequently changing their passwords.

Hackers may also gain access to a user's computer, where a file with UserIDs and passwords may be stored in memory, for example on a hard drive. Hackers may also gain access to UserID and password combinations by a method called "phishing", in which a hacker poses as a legitimate website, thereby enticing users to enter their UserID and password combinations.

Another source of vulnerability is the communication of UserIDs and passwords via unsecure connections. In most cases a user communicates with a limited access network via the Internet, and the user's UserID and password are communicated to, for example, a web server via unsecure communication channels, where they are vulnerable to interception.

Yet another area of vulnerability is the lookup table stored in the account server. There have been frequent reports of unauthorized access to, and theft of, the login accounts of thousands, sometimes millions of users of a particular service. Given the common practice of re-using UserIDs and passwords for a number of different accounts, these break-ins have a serious multiplier effect. In addition, there have no doubt been break-ins that have not been reported, making the problem even bigger than the general public may realize.

Satyanarayanan, M: "Integrating security in a large distributed system." ACM Transactions on Computer Systems, Vol. 7. No. 3, pages 247-280 provides a description of a distributed network implemented at Carnegie Mellon University (CMU) in the 1990's. Access to the network was limited to students and faculty of CMU. Users of the system would initiate a login protocol by entering a UserID and a password at a workstation connected to the network. An account server used a lookup table to associate the UserID with an encryption key, provided that the user had entered the correct password. Completion of the login protocol comprised a challenge/response based on the encryption key. The account server contained a lookup table of UserIDs and lightly encrypted passwords. The paper does not disclose how users of the system were first registered with their UserIDs and passwords, or how the encryption key was created and associated with the user.

The Secure Remote Password Protocol (SRP), a description of which can be found at http://srp.stanford.edu/design.html seeks to avoid the transmission of a password between a user device and a server. The user still uses a password, but the password is encrypted before it is sent to a server.

The Simple Certificate Enrollment Protocol (SCEP), a description of which can be found at www.cisco.com/, was designed to handle device registration in a relatively well-controlled environment. The SCEP server creates a challenge password, which is delivered to the requester and must be included with the submission back to the server. Although the SCEP protocol is used with untrusted devices, such use is ill-advised as explained by Shorter and Harris, "The Use of the Simple Certificate Enrollment Protocol (SCEP) and Untrusted Devices," see www.css-security.com/.

US 2011/0082801 discloses a login protocol comprising use of an encryption key stored by a requester in a secure storage. The encryption key is accessed using biometric data (such as a fingerprint template) uniquely associated with the requester. The protocol requires use of a biometric sensor.

In summary, existing systems are vulnerable to attack for any one or a combination of the following reasons:
- UserIDs and passwords are easy to guess;
- UserIDs and passwords are too short, and open to brute force attacks;
- UserIDs and passwords are re-used for various login accounts;
- Passwords are changed insufficiently frequently, if at all;
- UserIDs and passwords are transmitted over unsecure communication lines;
- UserIDs and passwords are stored in unsecure places;
- Once stolen, UserIDs and passwords can be used by a hacker without risk of detection of the unauthorized use;
- Attempts at improving the security of existing systems fail due to the need of many users to have UserIDs and passwords that are easy to remember. Solutions proposed in the prior art include protocols that still require the use of passwords, but avoid the need for transmitting such passwords between a requester and a server, or encrypt the password before transmitting it. These proposals potentially solve some of the above problems, but do not obviate the need of remembering and managing numerous passwords of undesirable complexity.

Other proposed solutions may work well in relative well-controlled environments, but are unsuitable for implementation to the general public on the Internet.

Protocols relying on biometric identification require that the requester have access to a biometric device at any time the requester wants to access a web service.

Thus, there is a need for a secure login protocol that avoids or mitigates some or all of the above problems. There is a particular need for such protocol that can be implemented in an uncontrolled environment, such as the Internet, with members of the general public. There is a further need for such protocol that does not require specific hardware for identification.

BRIEF SUMMARY OF THE INVENTION

The present invention addresses these problems by providing a process for authorizing a user's access to a limited access network, said process comprising:
a. receiving at a server a user's connection request;
b. upon establishing the requested connection, communicating to the user a server-controlled value;
c. receiving at the server a user's login request comprising a UserID or a derivative thereof, and a user challenge encrypted with a key held by the user and the server-controlled value;
d. locating a user key associated with the UserID;
e. generating a server random number and encrypting the server random number with the user key;
f. sending the encrypted server random number to the user;
g. receiving a value from the user confirming the user's ability to decrypt the encrypted server random number.

DETAILED DESCRIPTION OF THE INVENTION

The following is a detailed description of the invention.

Definitions

The term "limited access network" as used herein means any form of stored data that is accessible via the Internet or some other type of computer connection. The term encompasses websites; local networks; distributed networks; data collections; and the like. The present invention is inter alia concerned with a process for authorizing a user's access to any form of data that is accessible via the Internet. The form of data being accessed is in not in any way critical to the process of the invention, and is generically described as "limited access network."

In its broadest aspect the present invention relates to a process for authorizing a user's access to a limited access network, said process comprising:
a. receiving at a server a user's connection request;
b. upon establishing the requested connection, communicating to the user a server-controlled value;
c. receiving at the server a user's login request comprising a UserID or a derivative thereof, and a user challenge encrypted with a key held by the user and the server-controlled value;
d. locating a user key associated with the UserID;
e. generating a server random number and encrypting the server random number with the user key;
f. sending the encrypted server random number to the user;
g. receiving a value from the user confirming the user's ability to decrypt the encrypted server random number.

The term "server" refers to any type of device that provides an interface between the user and the limited access network. In many cases the server is a web server. The term "web server" is hereinbelow used broadly to mean any server that provides an interface between a user and a network, and has a much broader meaning than its customary usage. As described in more detail below, specific tasks involved in the process of the invention may be delegated to specific servers, such as an account server and/or a login server. The account server and/or the login server may be dedicated portions of the web server, or may be standalone servers that are in communication with the web server.

The connection request may be a request for a secure connection, for example an SSL connection or a TLS connection. Importantly, the encryption protocols exemplified herein provide security safeguards allowing secure login even when a secure connection is not available.

The connection may be established in any manner known in the art, for example using the TLS connection protocol. Once the connection is established, the server communicates to the user a server-controlled value. This is a value known by the server that the user needs for proper encryption of values the user will be transmitting to the server. The user may also need the server-controlled value for decrypting encrypted messages received from the server.

An example of a server-controlled value to be used in this context is an integer n informing the user of the number of bits of the appropriate key, and/or the length of a user random number to be used in a challenge, etc. Another example of a server-controlled number is a server certificate, which the user may incorporate in its encryptions. In specific embodiments the server may communicate to the user two or more server-controlled values.

In a next step the user communicates to the server a login request comprising a UserID (or a derivative thereof), and a user challenge The UserID may be a string of characters, such as a name or an alphanumeric string, memorized by the user. In this embodiment the login protocol relies on a combination of something that the user knows (the UserID) and something that the user has in possession (a key for decrypting the encrypted server random number). In an alternate embodiment the UserID may be a piece of biometric data, for example obtained from the user's retina or fingerprint. In this embodiment the login protocol relies on a combination of something that the user has exclusive control over (the UserID) and something that the user has in possession (a key for decrypting the encrypted server random number).

Of the two, only the UserID is communicated. Gaining access to a UserID, for example by interception of its transmission, does not provide a hacker with access to the limited access network, because such access also requires the ability to decrypt the server random number. As will be discussed in more detail below, in preferred embodiments the UserID is communicated in a computationally constructed form, making its interception even less useful to hackers. The UserID may, for example, be encrypted with a key held by the user. The UserID may be encrypted together with a value uniquely identifying the server, for example the URL of the server or a significant portion thereof. In an alternate embodiment the UserID may be encrypted together with a server-controlled value communicated to the user in step b. For example, the UserID may be encrypted with a certificate received from the server.

Encryption of the UserID with a value that is unique to the server allows the user to have one UserID for all servers that the user connects to from time to time. The encrypted version of it is unique to each server, due to the incorporation of the value that is unique to the server.

In addition to the (derivative of the) UserID, the user also transmits a user challenge. The user challenge may be a nonce encrypted with a key held by the user.

The user may hold a set of keys, one for each server with which the user is registered. The user may select the appropriate key by selecting or entering a number, or by clicking on an icon representing the desired key. For example, an icon showing a picture of a book may be used for the key needed for login to the user's account with an online bookstore; a rose icon for login to an online flower delivery service, etc.

In an embodiment the key may be auto-selected based on a value unique to the server, such as its URL or a portion thereof; a server-controlled value communicated to the user in step b., for example a server certificate, etc. In this embodiment the user does not need to remember or identify the key to be used in the login protocol.

The user generates a nonce and encrypts it with the appropriate key, taking into account a server-controlled value. The role of the server-controlled value may be to determine the length of the key and/or the length of the nonce. The server-controlled value may also be encrypted together with the nonce.

Upon receipt of the login request the server locates a user key associated with the UserID (or derivative thereof). As explained below in more detail, the step of locating the user key may comprise locating a site key and using the site key to calculate the user key. The various steps involved may all be carried out by the (web) server, or specific tasks may be delegated to other servers, such as an account server and/or a login server.

The located user number is used in decrypting the user's challenge. The server also generates a server challenge by encrypting a server random number with the user key. The user must prove its identity by showing it can decrypt the server challenge.

It is impossible to gain access to the Limited access network by replaying a previous successful login attempt, because the process involves the decryption of a server random number that is used only once. The value returned to the login server by the user in step e. will be an incorrect value in a subsequent login attempt, and therefore useless to a hacker.

The above-described process essentially serves to confirm to the web server that the user making the login attempt is who he pretends to be, that is, someone who knows (or has control over) the UserID, and has control over the key needed for decrypting the server random number.

The security of the process is enhanced by providing confirmation to the user of the authenticity of the limited access network. For this purpose the user's login request comprises an encrypted user random number. The server provides authentication to the user by successfully decrypting the encrypted user random number and by sending to the user a value confirming the server's ability to decrypt the encrypted user random number. This feature provides protection against phishing attempts, because illegitimate "look-alike" websites will be unable to provide the user with the required authentication.

For step d. it is possible to have a lookup table located in the web server, or in an account server associated with the web server. The step of locating the user key associated with the UserID, or a value representing the UserID can be a matter of looking up the user key in the lookup table. Such a lookup table may be vulnerable to hacking attempts, however. In a preferred embodiment the step of locating the user key associated with the UserID comprises generating the user key upon receipt of a login request. The user key may be generated by encrypting a stored site key using a secret key. The stored site key is associated with the user. The user key may be discarded immediately after use, so it is never stored. It is regenerated when a new login request is made.

The process of encrypting the site key with the secret key must be protected from outside attacks, and is preferably carried out in a Hardware Security Module (HSM). In preferred embodiments the process of the invention comprises additional server-side encryption and decryption operations. Preferably all such operations take place in the HSM. The HSM may be located inside the web server, or in a separate login server. In the latter case the communication channel between the web server and the login server preferably is a secure communications line.

It is contemplated that the role of the login server may be centralized for a number of Limited access networks. The login server role may be provided as a service to operators of websites, thereby relieving website operators of the tasks and responsibilities related to offering secure login to their users. The login server may take responsibility for additional tasks. For example, the login server may hold certificates for the web servers that it supports. These certificates may play a role in the secure login protocol of the present invention, as explained in more detail below.

The above-described process presupposes that the user has an account with the limited access network. The account can be set up in an account creation process. The main purpose of the account creation process is for the server to open an account for the user, and to create a site key associated with the user.

In an embodiment the login server also creates a user key during the account creation process. In an embodiment the user key is calculated by encrypting the site key with a current secret key. The user key may itself be encrypted, for example using a dummy key received from the user.

Still during the account creation process, the site key and the encrypted user key may be encrypted with a common key, for example a website key that is pre-shared by the login server and a web server, or with a public/private key pair. The login server may be used for carrying out calculations for the authentication protocols of several limited access networks. Preferably the login server uses a unique website key with each of the web servers that it operates with.

The encrypted values calculated with the website key are shared with an account server. The account server decrypts the received values with the pre-shared website key or with the private key of a public/private key pair, and stores the decrypted values. In an embodiment the account server stores the decrypted values alongside the UserID or, preferably, a value representing the UserID, such as a hash value.

In both the account creation process and in the login process the secret key plays an important role. The secret key may be static, but preferably the secret key is dynamic, that is, the secret may be changed from time to time.

In an embodiment the secret key is selected from a plurality of secret keys. The plurality of secret keys may be placed in an array, preferably indexed in chronological order of creation. The user key is updated with the new current secret key. This may be done automatically, in a process that is invisible to the user.

The user may be allowed access to the limited access network based on the user's use of an old user key. Restrictions may be put on the authorized access based on an old user key. For example, such access could be restricted to a specific time period since the last successful login. If a user has failed to meet a condition for network access, for example by failing to pay a required subscription fee, the user may be allowed one login for correcting the deficiency. Certain users may be denied access altogether, for example by limiting the number of secret keys available to that user to zero.

The protocol can be implemented on standard equipment. Specifically, all that is needed at the user's end is a computing device with a web browser. The user may desire additional protection and choose to hide its keys behind a biometric device, but this is not necessary for operation of the protocol. A website operator wishing to upgrade its login security can do so by placing a key ring and the accompanying software in the web browsers of all of its users, no matter how outdated the user's equipment. This makes it possible for a website operator to roll out an upgrade when it desires to do so, without having to wait for specific devices, such as biometric sensors, to have been adopted by all of its users.

As a general rule, no actual values are transmitted in the protocol of the present invention, only encrypted values. The skilled person is familiar with established encryption protocols, any of which may be employed in the implementation of the present invention. Examples of suitable cryptographic algorithms suitable for use in the present invention include AES (Advanced Encryption Standard) 256; SHA (Secure Hash Algorithm) 256; and RSA 2048. Because of the highly random nature of some of the values being transmitted light encryption algorithms, such as XORing, may be used in some cases.

Description of Illustrative Embodiments/Examples

The following is a description of certain embodiments of the invention, given by way of example only.

The invention will be illustrated with reference to an Internet website having controlled access. It will be appreciated, however, that the invention is equally applicable to other situations where a user seeks access to a controlled access network, such as a local network belonging to the user's employer, etc. For this reason terms like "website" and "web server" should be given an expansive interpretation.

1. Setting Up an Account

In this example a person wishing to gain access to a controlled access network, such as a website, is referred to as a "User." The User wishes to connect to a server running the website. This server is referred to as the "web server." For gaining access to the website the User needs to have an account with the website. The account of the User, together with the accounts of other users, is administered by an account server. The account server may be a dedicated portion of the web server, or it may be a separate server. In the latter case the account server and the web server may be located in physical proximity to each other, for example in the same room, or they may be in physically remote locations. It is desirable that communications between the web server and the account server take place via secure communication channels.

For a proper understanding of the present invention it is not always necessary to distinguish between the web server and the account server. In the following discussion, reference may from time to time be made to the web server when, strictly speaking, the term account server could have been used. Nevertheless, the skilled person will have no problem understanding the operation of the invention.

The web server is connected to a login server. The login server may be a dedicated portion of the web server, or it may be a separate server. In the latter case the login server and the web server may be located in physical proximity to each other, for example in the same room, or they may be in physically remote locations. It is desirable that communications between the web server and the login server take place via secure communication channels. It is conceivable to have the login server operated by a separate entity that provides secure login services to one or a number of websites.

For setting up an account with the web server, the User must be in possession of a key. In this embodiment the User has possession of a collection of keys, for example 99 keys, which can be stored in a mathematical matrix in a memory that is accessible to the User. The matrix can be seen as a mathematical equivalent of a physical key ring, and will be referred to herein as the key ring. Each of the 99 keys on the key ring is identified by a whole number 1 through 99, which corresponds to its position in the matrix. The key ring may further comprise a key ring Identifier, which is a key with reference number 0 (zero) on the key ring, referred to as $Z[0]$. Each key on the key ring can be a string of random bits, for example 128 bits. The User does not need to remember, or even know, these strings. The User only needs to remember, or write down, the number of the key used for a particular website.

As in existing login schemes, the User needs a user identification, or UserID. This should be a string of characters that is easy for the User to remember, or something based on data over which the User has exclusive control, such as biometric data. The User does not send his UserID to the Web Server, but an encrypted form of the UserID, such as a hash value. The hash value may be constructed using a combination of the UserID and the Key Ring Identifier $Z[0]$.

First, hashes are computed for the key ring Identifier and the UserID:

$$H_0 = SHA_{256}(Z[0])$$

$$H_1 = SHA_{256}(ID)$$

Or, in order to create a value of $U_h$ that is unique to the server, the UserID is hashed with the domain name of the server:

$$H_1 = SHA_{256}(ID + domain.name)$$

Then $U_h$ is calculated in an XOR operation on the two hash values:

$$U_h = H_0 \oplus H_1.$$

The hash value $U_h$ is constructed from something the User controls (the key ring identifier) and something the User knows. The User may choose a simple UserID, because the UserID itself is not communicated to the web server. Moreover, there is little harm in the User's use of the identical UserID for a number of different websites.

When the User for the first time uses the key ring in applying for a website account, none of the keys on the key ring is in active use. Put differently, all keys on the key ring are dummy keys at that point. When the User applies for a new account, the website notifies the User of the number of bits n that are used for keys. The website also makes the public key part $K_{le}$ of a public/private key combination available to the User. The private key $K_{LE}$ is kept by the login server.

The User selects dummy key with index number (d) from the Key Ring.

$$K_d = Z[d] \bmod 2^n$$

In an alternate, and preferred, embodiment index number d is not selected by the user, but is calculated based in a value that is unique to the web server. For example, d may be a hash value of the domain name of the web server:

$$d = SHA_{256}(domain.name)$$

$$d = SHA_{256}(Z[0] + domain.name)$$

In yet another embodiment, index number d may be a hash of a certificate received from the web server. In this embodiment the user establishes a secure connection with the web server, for example using the TLS protocol. The web server communicates a server certificate $C_s$ to the user, which forms a basis for the computation of index number d, for example:

$$d=SHA_{256}(C_s)$$

or, preferably:

$$d=SHA_{256}(C_s+Z[0])$$

The advantage of binding index number d to a unique value of the server is that key lookup can be automated, so that the user does not need to remember which key to use for the specific web site.

Regardless of how the value of d is selected, the User's computer then encrypts the selected dummy key with the public key.

$$K_h=E_{RSA}(K_d,K_{le})$$

The User then sends $U_h$ and $K_h$ to the web server, together with any other information that is considered relevant for opening an account. The web server creates a new account identified by $U_h$, and sends $K_h$ and n to the login server.

All mathematical operations of the login server are carried out inside a High Security Module (HSM). The login server creates a new site key $K_s$, which it encrypts using the private key $K_{LE}$:

$$K_s=Random(n)$$

$$K_y=E_{RSA}(K_s,K_{ae})$$

wherein $K_{ae}$ is a public key of which the accounts server holds the private key $K_{AE}$.

$K_s$ is encrypted using a current Secret Key S[0]:

$$K_u=AES_{256}(Ky,S[0]) \bmod 2^n$$

and the (2048 bit) value $K_h$ is decrypted with the private key $K_{LE}$ to yield $K_d$:

$$K_d D_{RSA}(K_h,K_{LE})$$

which is then used to encrypt $K_u$:

$$K_x=K_u \oplus K_d$$

Values $K_y$ and $K_x$ are sent to the web server. The web server relays $K_y$ and $U_h$ to the accounts server, which uses its private key to decrypt $K_y$ to get the site key $K_s$. The site key is immediately encrypted again.

$$K_s=D_{RSA}(K_y,K_{AE})$$

$$K_a=E_{RSA}(K_s,K_{le})$$

The encrypted value $K_a$ is stored in the accounts server alongside $U_h$. In future login attempts value $K_a$ is sent to the login server without further processing.

The encrypted user key $K_x$ is sent to the user, who can decrypt it using the dummy key that was used in the account creation:

$$K_u=K_x \oplus K_d$$

Finally, the user key is placed in the key ring at location d with something like:

$$Z[d]=(Random(128-n)<<n) \oplus K_u$$

The account creation protocol is summarized in Table 1.

TABLE 1

| | | Applying for a new account | | | |
|---|---|---|---|---|---|
| Step | User | Value | Webserver | Value | Login server |
| 1 | | $\Leftarrow$ | n = 13 | | |
| 2 | ($K_d$ = 4444) $K_h$ = 7707 | $K_h \Rightarrow$ | | | |
| 3 | | | Create account | $K_{h;n} \Rightarrow$ | |
| 4 | | | | $\Leftarrow K_x:K_y$ | ($K_s$ = 4289) $K_y$ = 1299 ($K_u$ = 1093) ($K_d$ = 4444) $K_x$ = 5401 |
| 5 | | $\Leftarrow K_x$ | $K_s$ = 4289 | | |
| 6 | $K_u$ = 1093 | | | | |

The $U_h$ value may be strengthened in a number of ways. The value is $H_0$ computed as before:

$$H_0=SHA_{256}(Z[0])$$

If a biometric value is used it may replace the user identification string when calculating $H_1$:

$$H_1=SHA_{256}(bio.value+domain.name)$$

$$U_h=H_0 \oplus H_1.$$

Instead of replacing the UserID with the bio.value, the former can also be added as a separate value:

$$H_1=SHA_{256}(ID+domain.name)$$

$$H_2=SHA_{256}(bio.value)$$

$$U_h=H_0 \oplus H_1 \oplus H_2$$

The same approach can be used to incorporate a value from a hardware token:

$$H_1=SHA_{256}(ID+domain.name)$$

$$H_2=SHA_{256}(token.value)$$

$$U_h=H_0 \oplus H_1 \oplus H_2$$

It may be desirable to bind an account to two users:

$$H_1=SHA_{256}(ID+domain.name)$$

$$H_2=SHA_{256}(bio.value1+bio.value2)$$

$$U_h=H_0 \oplus H_1 \oplus H_2$$

The encryption may be strengthened further by adding a hardware token:

$$H_1=SHA_{256}(ID+domain.name)$$

$$H_2=SHA_{256}(token.value)$$

$$H_3=SHA_{256}(bio.value1+bio.value2)$$

$$U_h=H_0 \oplus H_1 \oplus H_2 \oplus H_3$$

A user may access a website from various devices, such as a tablet, a smart phone, or a PC. Each device may offer different means for generating a biometric value, or may not offer such a means. In general the value of $U_h$ will depend on the device that is being used, making it desirable to allow for multiple $U_h$ values to be linked to one account.

As a result of the account creation protocol, the User is now in possession of a unique user key $K_u$, which is based on a Secret Key that is never communicated outside the HSM of the login server. User key $K_u$ can be as long as the operator of the website desires it to be, to (in this embodiment) a maximum of 128 bits. The User only needs to remember its index number k in the key ring. Instead of using a number, the User key may be remembered by some other means. For example, all keys on the key ring may be associated with icons or photos. The User then only needs to remember the photo or icon associated with the key for a particular website.

Moreover, $K_u$ can be modified on a frequent basis without any inconvenience to the User, as will be explained in more detail below.

As the User creates accounts with other websites, an increasing number of keys on the key ring will become active, and a decreasing number will be dummy keys. If a hacker were to obtain the key ring, it will be impossible to determine which of the keys are active and which are dummies, or for what website a key may be usable. Unauthorized access to the website is virtually excluded, because the hacker would not be able to use the key ring without knowing the UserID. Security can be enhanced further by storing the Key Ring in a secure area.

Algorithm 1 shows the account creation steps on the side of the User:

---
Algorithm 1 Computing the hash of the userid.
---
1: procedure UserIDHASH(Z, userid)
2:    $H_0 \leftarrow SHA_{256}(Z[0])$    ▷ Hash the keyring identifier.
3:    $H_1 \leftarrow SHA_{256}(userid)$    ▷ Hash the userid.
4:    return $H_0 \oplus H_1$    ▷ This will be value $U_h$.
---

Algorithm 2 shows the account operation steps on the side of the Login Server:

---
Algorithm 2 Generate values for a new account.
---
1: procedure NEWACCOUNT($K_h$,n)
2:    $K_s \leftarrow RANDOM(n)$    ▷ Generate n-bit pseudo-random number.
3:    $K_y \leftarrow \varepsilon_{RSA}(K_s,K_{ac})$    ▷ Encrypt $K_s$ with accounts server public key.
4:    $\kappa_d \leftarrow D_{AES}(K_k, \kappa_{LE})$    ▷ Decrypt to get dummy key.
5:    $K_u \leftarrow \varepsilon_{AES}(K_s,S[0]) \mod 2^n$    ▷ This is the new user key.
6:    $K_x \leftarrow K_u \oplus K_d$    ▷ Encrypt this with the decrypted dummy key.
7:    return $K_x$, $K_y$
---

2. Login in a Static Secret Key Environment

The simplest login protocol applies to embodiments in which the Secret Key is static, that is, it is not changed. The login protocol proceeds as follows.

When the User connects to the Web Server the latter communicates the value of n, that is, the number of bits in a key, to the User. In certain embodiments the Web Server also communicates its certificate $C_s$, which is used to determine the value of index k for the appropriate key on the User's key ring. The User's computer generates a pseudo-random number $R_u$, and encrypts this number with the user key $K_u$, which was put on the User's key ring at index k during the account setup procedure:

$$R_u = Random(n)$$

$$K_u = Z[k] \mod 2^n$$

$$A_u = R_u \oplus K_u$$

The User's computer also re-calculates the value $U_h$. The values $A_u$ and $U_h$ are communicated to the web server. In addition the User's computer calculates a hash value $B_u$ of the pseudo-random number $R_u$:

$$B_u = SHA_{256}(R_u) \mod 2^n$$

Value $B_u$ is temporarily stored in the User's computer.

The Web Server looks up encrypted site key $K_a$ based on the received value $U_h$, and sends values $A_u$, $K_a$ and n to the Login Server. In case n is static, the login server may have the value n stored in memory, so that this value does not need to be communicated.

The login server carries out a number of calculations within the HSM. It decrypts $K_a$ and regenerates the User key $K_u$, using the same calculations that were used during the account setup procedure:

$$K_s = D_{RSA}(K_a,K_{LE}) \mod 2^n$$

$$K_u = AES_{256}(Ky,S[0]) \mod 2^n$$

It then uses $K_u$ to decrypt $A_u$:

$$R_u = A_u \oplus K_u$$

In addition the login server calculates a hash value $B_s$ of $R_u$:

$$B_s = SHA_{256}(R_u) \mod 2^n$$

Alternatively, and preferably, is additionally encrypted with $K_u$:

$$B_s = K_u \oplus (SHA_{256}(R_u) \mod 2^n)$$

The value $B_s$ may be returned to the User, allowing the User to verify the authenticity of the website. Alternatively, in case the login server has possession of the private portion $K_{LS}$ of a signing key pair, the value $B_s$ may be replaced with a signature thereof with the signing key $K_{LS}$:

$$B_s = S_{RSA}(B_s,K_{LS})$$

In this case the signature is sent to the User, not the value $B_s$ itself. The User combines $B_s$ and $B_u$ and conducts a verify on this combination.

In addition the login server may generate a pseudo-random number $R_s$, which is encrypted and can be used to verify the bona fides of the User:

$$R_s = Random(n)$$

$$P_s = R_s \oplus K_u$$

$$Q_s = R_s \oplus R_u$$

Alternatively, and preferably, $Q_s$ is more heavily encrypted;

$$Q_s = R_s \oplus (SHA_{256}(R_u) \mod 2^n)$$

The login server sends $Q_s$, $B_s$ and $P_s$ to the web server, which forwards $B_s$ and $P_s$ to the User. The value $Q_s$ is temporarily stored by the web server. The User's computer compares $B_s$ and $B_u$. If the two values are identical the User knows that the website is legitimate, and identical to the website with which the account has previously been set up. If the two values are not identical the User should abort the login attempt.

If $B_s$ matches $B_u$, the User's computer proceeds to decrypt $P_s$ to obtain $R_s$, and calculates a hash of $R_s$:

$$R_s = P_s \oplus K_u$$

$$Q_u = R_s \oplus R_u$$

Or, if the alternate encryption protocol is used:

$$Q_u = R_s \oplus (SHA_{256}(R_u) \bmod 2^n)$$

The value $Q_u$ is returned to the Web Server. If $Q_u$ matches $Q_s$ the Web Server has confirmation that the User has possession of $K_u$, and the User is logged in. Both values $Q_s$ and $Q_u$ are erased.

The login procedure is very similar in case a dynamic secret key is used, but the key held by the User is up to date. This procedure is summarized in Table 2.

If, however, the Secret Key has been modified since the User's last successful login attempt, the User Key $K_u$ held by the User is not up to date, and the value $B_s$ does not match $B_u$. In a dynamic Secret Key environment this does not lead to a failed login attempt. Instead, the web server instructs the login server to increment the value i by one. In other words, the login server is instructed to repeat the login protocol with the most recent old key S[i+1]. If the User's last successful login attempt was made when S[i+1] was the current Secret Key, the User Key held by the User corresponds to this Secret Key, and the login will be successful at this second try. If not, the value of i may again be incremented by one, and the login protocol may be repeated with the next youngest old Secret Key. The web server may put a limit on the number of iterations, so that a User holding a very old User Key may need to request an account reset, or repeat the account setup procedure.

TABLE 2

Login with a new key

| Step | User | Value | Webserver | Value | Login server |
|---|---|---|---|---|---|
| 1 | | ⇐ n | n = 13 | | |
| 2 | $U_h$ = xyz ($R_u$ = 8021) $A_u$ = 1234 ($B_u$ = 5432) | $A_u;U_h \Rightarrow$ | $U_h \Rightarrow K_s$ i = −1 | | |
| 3 | | | i = i + 1 | $A_u;K_s;i;n \Rightarrow$ | i < m |
| 4 | | | | | $B_s$ = 5432 ($R_u$ = 8021) $P_s$ = 8172 ($R_s$ = 2776) $Q_s$ = 5517 |
| 5 | | | $Q_s \neq 0$ $B_s$ = 5432 $P_s$ = 8172 ($Q_s$ = 5517) | ⇐ $B_s;P_s;Q_s$ | |
| 6 | $B_s \neq 0$ $B_u = B_s \Rightarrow$ ($R_s$ = 2776) $Q_u$ = 5517 | ⇐ $B_s;P_s$ $Q_u \Rightarrow$ | $Q_u = Q_s$ $B_s$ = 0 | | |
| 7 | $B_s$ = 0 Login OK | ⇐ $B_s;P_s$ | $P_s = Q_s$ | | |

In the embodiment of Table 2 $K_s$ is used by the login server, instead of $K_u$.

The login procedure does not involve communication of a UserID or a password. Instead, meaningless strings of numbers are communicated. Successful interception of communications between the User and the Web Server does not provide a hacker with any tools that could be used for an illegitimate login attempt.

3. Login in a Dynamic Secret Key Environment

For added security a new Secret Key may be created and added to array S from time to time. The Secret Key is never communicated outside the HSM, and is not particularly vulnerable to a security attack. The corresponding User key $K_u$, however, is stored on a User's computer and therefore far more vulnerable to a security attack than the Secret Key itself. The User key can be updated after the Secret Key has been changed in a manner that does not require any intervention on the part of the User, as illustrated by the following example.

A new Secret Key S[0] is created on a schedule determined by the login server. The Secret Key in position S[m−1] s removed from the array. All other Secret Keys are moved up one position in the array, so that position S[0] becomes free for the new Secret Key. The oldest Secret Key in array S is only deleted if necessary to avoid that the number of Secret Keys in array S exceeds a predetermined number m. If the Secret Key is unchanged since the last successful login attempt by the User, the User Key $K_u$ held by the User is up to date, and the login attempt will be successful.

When a successful login attempt has been made with an old User Key, the session is used to update the User Key. The new User Key is calculated in a manner similar to the account setup protocol. The new User Key $R_s$ is encrypted with the old User Key $K_u$, so that the User will be able to decrypt it:

$$R_s = AES_{256}(Ks, S[0]) \bmod 2^n$$

$$P_s = R_s \oplus K_u$$

The User's computer decrypts $P_s$ and stores it in the Key Ring, overwriting the old key the User has just used:

$$Z[k] = (Random(128-n) << n) \oplus R_s$$

whereby all bits of Z[k] are replaced.

The User does not need to be aware that any of this takes place. The User simply remembers the index number k for the key that is used for logging in to this particular website. The User may not know whether, or how often, the key is changed.

Table 3 summarizes the login procedure for a dynamic Secret Key environment:

TABLE 3

Login with old key

| Step | User | Value | Webserver | Value | Login server |
|---|---|---|---|---|---|
| 1 | | ⇐ n | n = 13 | | |
| 2 | $U_h$ = xyz<br>($R_u$ = 8021)<br>$A_u$ = 1234<br>($B_u$ = 5432) | $A_u;U_h$ ⇒ | n = 13<br>i = −1<br>$U_h$ ⇒ $K_s$ | | |
| 3' | | | i = i + 1 | $A_u;K_s;i;n$ ⇒ | i < m |
| 4' | | | | ⇐ $B_s;P_s;Q_s$ | $B_s$ = 1902<br>($R_u$ = 922)<br>$P_s$ = 6300<br>($R_s$ = 4994)<br>$Q_s$ = 4120 |
| 5' | | | $Q_s \ne 0$<br>$B_s$ = 1902<br>$P_s$ = 6300<br>($Q_s$ = 4120) | | |
| 6' | $B_s \ne 0$<br>$B_u \ne B_s$<br>$Q_u$ = 0 | ⇐ $B_s;P_s$<br>$Q_u$ ⇒ | $Q_u \ne Q_s$ | | |
| 3'-6'* | • • • | • • • | • • • | • • • | • • • |
| 3 | | | i = i + 1 | $A_u;K_s;i;n$ ⇒ | i < m |
| 4 | | | | ⇐ $B_s;P_s;Q_s$ | $B_s$ = 5432<br>($R_u$ = 8021)<br>$P_s$ = 8172<br>($R_s$ = 2776)<br>$Q_s$ = 5517 |
| 5 | | | $Q_s \ne 0$<br>$B_s$ = 5432<br>$P_s$ = 8712<br>($Q_s$ = 5517) | | |
| 6 | $B_s \ne 0$<br>$B_u = B_s$<br>($R_s$ = 5678)<br>$Q_u$ = 5517 | ⇐ $B_s;P_s$<br>$Q_u$ ⇒ | $Q_u = Q_s$<br>$B_s$ = 0 | | |
| 7 | $B_s$ = 0<br>Login OK | ⇐ $B_s;P_s$ | $P_s = Q_s$ | | |
| 8 | $P_s \ne A_u$<br>Update keyring | | | | |

The procedure is similar to that of Table 2, but because in the first attempt an invalid key was used, the web server concludes that $Q_u$ (being zero) is not equal to $Q_s$. This leads the web server to increment index i by 1, that is, to instruct the login server to repeat the calculations with i=1. This loop is repeated until a working key is found, or the limit m of value i is reached.

By way of example, a web site may replace its Secret Key once a month, and may permit access to "active" users who have accessed the web site less than a year prior. The active key set of this web site holds twelve keys, the current key and the eleven most recent old keys. The value of m in this example is 12. If a user makes a login attempt with a key that is more than 12 months old, this user will be denied access. This is summarized in Table 4.

TABLE 4

Login with wrong key

| Step | User | Value | Webserver | Value | Login server |
|---|---|---|---|---|---|
| 1 | | ⇐ n | n = 13 | | |
| 2 | $U_h$ = xyz<br>($R_u$ = 8021)<br>$A_u$ = 1234<br>($B_u$ = 5432) | $A_u;U_h$ ⇒ | n = 13<br>i = −1<br>$U_h$ ⇒ $K_s$ | | |
| 3' | | | i = i + 1 | $A_u;K_s;i;n$ ⇒ | i < m |
| 4' | | | | ⇐ $B_s;P_s;Q_s$ | $B_s$ = 1902<br>($R_u$ = 922)<br>$P_s$ = 6300<br>($R_s$ = 4994)<br>$Q_s$ = 4120 |
| 5' | | | $Q_s \ne 0$<br>$B_s$ = 1902<br>$P_s$ = 6300<br>($Q_s$ = 4120) | | |
| 6' | $B_s \ne 0$<br>$B_u \ne B_s$<br>$Q_u$ = 0 | ⇐ $B_s;P_s$<br>$Q_u$ ⇒ | $Q_u \ne Q_s$ | | |
| 3'-6'* | • • • | • • • | • • • | • • • | • • • |
| 3 | | | i = i + 1 | $A_u;K_s;i;n$ ⇒ | i ≥ m |

TABLE 4-continued

Login with wrong key

| Step | User | Value | Webserver | Value | Login server |
|------|------|-------|-----------|-------|--------------|
| 4 | | | | | $B_s = 0$ |
| | | | | | $P_s = 0$ |
| | | | $Q_s \neq 0$ | $\Longleftarrow B_s;P_s;Q_s$ | $Q_s = 0$ |
| 5 | | | $B_s = 0$ | | |
| | | | $P_s = 0$ | | |
| | $B_s = 0$ | $\Longleftarrow B_s;P_s$ | $(Q_s = 0)$ | | |
| 6 | $P_s = Q_s = 0 \Longrightarrow$ | | | | |
| | Login Failed | | | | |

The roles of the User, the Web Server and the Login Server are outlined in Algorithms 3, 4 and 5, respectively:

---

Algorithm 3 The login program of the user.

```
1: procedure USERLOGIN(U_h,Z,k,K_1s)
2:     R_u ← RANDOM(n)                    ▷ Generate n-bit pseudo-random number.
3:     K_u ← Z[k]                         ▷ Take key from keyring.
4:     A_u ← R_u ⊕ K_u                    ▷ Compute a challenge.
5:     B_u ← SHA_256(R_u) mod 2^n         ▷ And the response also.
6:     Q_u,j ← 0,0                        ▷ Initialize.
7:     B_s,P_s ← SENDTOWEBSERVER(U_h,A_u) ▷ Wait for B_s and P_s.
8:     while B_s ≠ 0 do                   ▷ Website is trying keys for us.
9:         if V_RSA(B_u + B_s,K_1s) then  ▷ Verify B_s. Website found the right key!
10:            R_s ← P_s ≠ K_u
11:            Q_u ← R_s ⊕ R_u            ▷ Compute response to P_s.
12:        else
13:            Q_u ← ASKTOCONTINUE(j)     ▷ Return 0 to continue; 1 to stop.
14:        B_s,P_s ← SENDTOWEBSERVER(Q_u) ▷ Answer to million dollar question.
15:        j ← j + 1                      ▷ One more attempt.
16:    if Q_u > 1 and P_s > 1 then        ▷ Login succeeded.
17:        if j > 1 then                  ▷ Not the first attempt with this key.
18:            if P_s ≠ A_u then          ▷ We are not denied a new key.
19:                UPDATEKEYRING(Z,k,R_s) ▷ New key is sent with R_s.
```

---

Algorithm 4 The login program of the webserver.

```
1: procedure WEBSERVERLOGIN(U_h,A_u,u)
2:     F ← 0                              ▷ Login state.
3:     K_a,s,D ← GETACCOUNTINFO(U_h)      ▷ Query the accounts server.
4:     if K_a ≠ 0 then
5:         i ← GETINDEX(s,D)              ▷ Use account status and last login date to get i.
6:         repeat
7:             B_s,P_s,Q_s ← HSM(A_u,K_a,n,v,i)  ▷ Call this function on login server.
8:             if Q_s ≠ 0 then
9:                 Q_u ← SENDTOUSER(B_s,P_s)     ▷ Wait for Q_u.
10:            else                       ▷ Array S exhausted.
11:                Q_u ← Q_s              ▷ No point going on: terminate loop.
12:            if Q_u = 1 then            ▷ User aborted login.
13:                Q_s ← Q_u              ▷ Terminate loop at user's request.
14:            if s > 0 then              ▷ Something required from the user.
15:                if i < MAX_ACTIVE_KEYS then
16:                    i ← i + 1
17:                else
18:                    Q_u ← Q_s          ▷ Terminate loop (Q_s = 0).
19:        until Q_u = Q_s
20:        F ← Q_s                        ▷ Return Q_s by default.
21:        if Q_s > and s > 0 then        ▷ Login succeeded but something required.
22:            F ← A_u                    ▷ Login granted for now.
23:    SENDTOUSER(0, F)                   ▷ Indicate login state.
```

---

Algorithm 5 The program of the login server, running inside the HSM.

```
1: procedure HSM(A_u, K_a, n, v, i)
2:     if i < MAX_KEYS then               ▷ Use all keys from array S.
3:         K_s ← D_RSA(K_a,K_LE) mod 2^n  ▷ Decrypt the site key K_s.
4:         K_u ← AES_256(K_s,S[i]) mod 2^n ▷ Temporarily regenerate user key.
```

| | Algorithm 5 The program of the login server, running inside the HSM. | |
|---|---|---|
| 5: | $R_u \leftarrow A_u \oplus K_u$ | ▷ Calculate the user random. |
| 6: | $B_s \leftarrow SHA_{256}(R_u) \bmod 2^n$ | ▷ Compute the hash over the random. |
| 7: | if v = true then | ▷ User can verify using certifcate. |
| 8: | $B_s \leftarrow S_{RSA}(B_s, K_{LS})$ | ▷ Replace hash with signature. |
| 9: | if i > 0 then | ▷ Not the first attempt with $K_s$. |
| 10: | $R_s \leftarrow AES_{256}(K_s, S[0]) \bmod 2^n$ | ▷ Send user a new key. |
| 11: | else | ▷ First attempt or not allowed a new key. |
| 12: | $R_s \leftarrow RANDOM(n)$ | ▷ Generate n-bit pseudo-random number. |
| 13: | $P_s \leftarrow R_s \oplus K_u$ | ▷ Compute a challenge. |
| 14: | $Q_s \leftarrow R_s \oplus R_u$ | ▷ And the response also. |
| 15: | else | ▷ Array S is exhausted. |
| 16: | $B_s, P_s, Q_s \leftarrow 0,0,0$ | ▷ It's game over. |
| 17: | return $B_s, P_s, Q_s$ | ▷ Return these to the webserver. |

Figure 1:
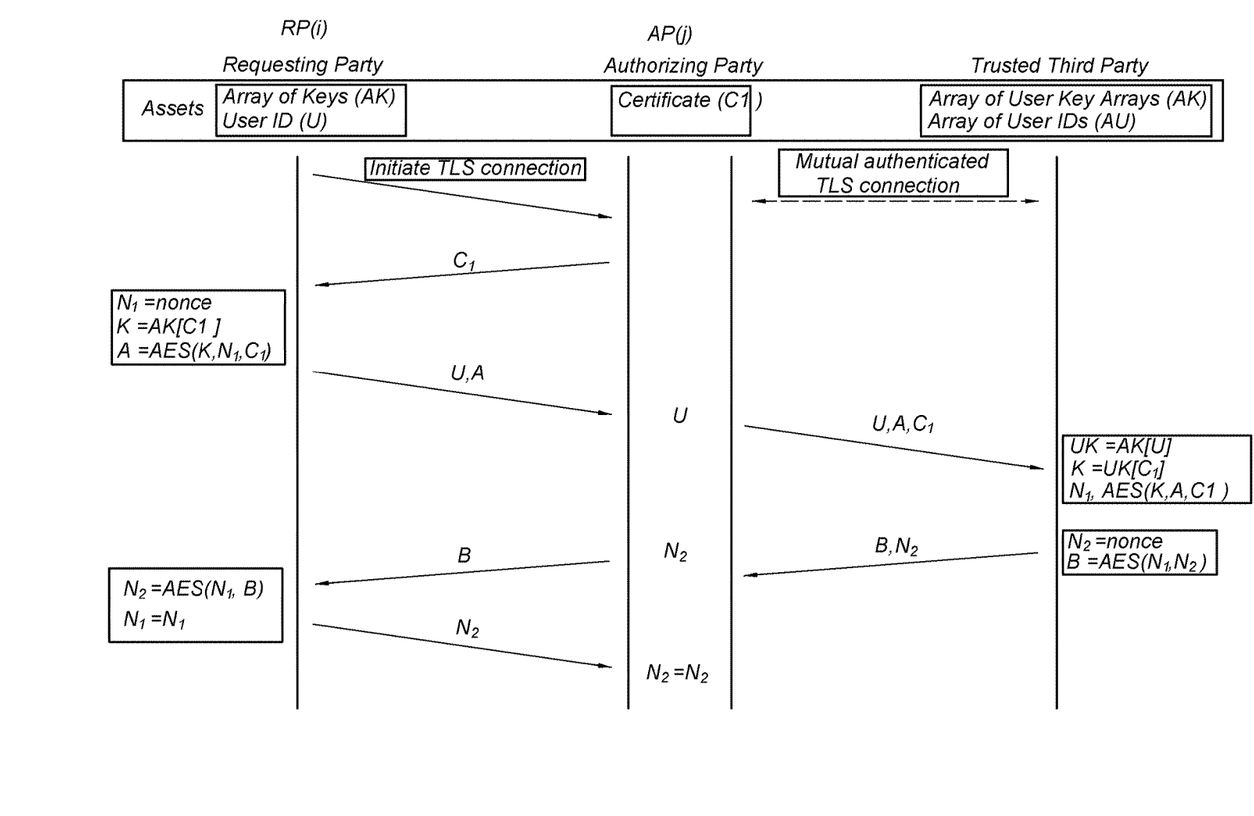
FIG. 1 is a schematic representation of an embodiment of the invention.

FIG. 1 is a schematic representation of an alternate embodiment of the present invention. A Requesting Party RP(i) initiates a secure connection with an Authorizing Party AP(j), for example by using the Transport Layer Security (TLS) protocol. TLS is generally considered to provide confidentiality, integrity and authentication. In the course of setting up the secure connection, AP(j) provides RP(i) with a certificate C1.

Once the secure connection is established, RP(i) generates a nonce N1. RP(i) uses certificate C1 to look up an encryption key K[C1], which was provided to RP(i) by AP(j) previously, for example in a registration session or a key refreshment protocol as described in the context of the first embodiment. Linking the appropriate key to certificate C1 provides several advantages. Key look up can be automated, so that RP does not need to remember a key number associated with this specific AP(j). In addition, it makes sure that the appropriate key can only be used for this specific AP(j).

RP(i) generates a value A by encrypting its nonce N1 and C1, using an established encryption protocol, for example AES. RP(i) transmits value A to AP(j), together with a value U associated with the identity of RP(i). The value U can be RP(i)'s UserID, or an encryption of RP(i)'s UserID. In a preferred embodiment U is obtained by encrypting RP(i)'s UserID together with a value that is unique for AP(j), for example C1. In this manner RP(i) needs to remember or store just one UserID, and yet generate values of U that are unique for each AP.

AP(j) transmits the values U, A and C1 to a Trusted Third Party (TTP) via a secure connection, for example a mutually authenticated TLS connection or an IPsec tunnel. TTP looks up a list AK[U] of keys associated with value U, and from this list selects UK[C1], the key associated with RP(i) for the AP(j) holding certificate C1, wherein UK[C1]=K.

TTP uses K and C1 to decrypt value A to produce N1, using the agreed encryption protocol, for example AES. TTP also generates a nonce N2, which is encrypted with N1 to produce value B. TTP transmits B and N2 to AP(j), which in turn transmits B to RP(i). The latter uses N1 to decrypt B, thereby obtaining N2. RP(i) transmits its value of N2 to AP(j), which compares it to the value of N2 it received from TTP. If the two values match, RP(i) is allowed access to AP(j)'s site.

Thus, the invention has been described by reference to certain embodiments discussed above. It will be recognized that these embodiments are susceptible to various modifications and alternative forms well known to those of skill in the art. For example, the login protocol may be modified by having the web server decide the value of i based on the most recent successful login attempt of the User, so that the correct Secret key is used in the first.

Many modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A process for authorizing to a user access to a limited access network, said process comprising:
   a. receiving at a server a connection request from the user;
   b. upon establishing the requested connection, communicating to the user a server-controlled value;
   c. receiving at the server a login request from the user comprising a UserID or a derivative thereof, and a user challenge encrypted with a key held by the user and the server-controlled value;
   d. locating a user-key associated with the UserID;
   e. generating a server random number and encrypting the server random number with the user-key;
   f. sending the encrypted server random number to the user;
   g. receiving a value from the user confirming the user's ability to decrypt the encrypted server random number;
   wherein, at the server, the user-key is generated by encrypting a stored site key, associated with the user, using a secret key.

2. The process of claim 1 wherein the user-key is deleted from the server after a login decision is made.

3. The process of claim 1, wherein a user random number is encrypted with the user-key by the user, and decrypted with the user-key by the server.

4. The process of claim 1 wherein the server random number is encrypted with the user-key by the server, and decrypted with the user-key by the user.

5. The process of claim 1, which is preceded by an account creation process comprising creating a site key associated with the user.

6. The process of claim 5 wherein, during the account creation process, a user key is created.

7. The process of claim 6 wherein, during the account creation process, the user key is calculated by encrypting the site key with a current secret key.

8. The process of claim 1, wherein the user-key is refreshed on a regular basis by creating a new key and labeling the previous user-key as an old key.

9. The process of claim 8 wherein the new key and a predetermined number of old keys are stored as active keys.

10. The process of claim 9 wherein the user is authorized access to an Internet domain upon receipt by the server of a valid UserID and confirmation of the user's ability to decrypt the encrypted server random number with an active key associated with the UserID.

11. The process of claim 10 comprising sequential login attempts wherein active keys are used in inverse chronological order of creation.

12. The process of claim 11 wherein the user is denied access to the Internet domain if the user-key used for decrypting the server random number is not an active key.

13. The process of claim 11 wherein the new key is communicated to the user if the user was authorized access to the Internet domain upon use of an active key that is not the new key.

14. The process of claim 13, wherein the user is denied access to the Internet domain until a predetermined condition is met, by temporarily limiting the number of active keys that will be tried in the process, and not communicating to the user a new key until the condition is met.

15. The process of claim 11 wherein the new key is not communicated to the user if an account associated with the user is considered delinquent.

16. The process of claim 15 wherein the user is notified of an account delinquency, and the new key is communicated to the user upon the user having remedied the delinquency.

17. The process of claim 1, wherein all values related to user authentication are communicated between the user and the server in encrypted form.

\* \* \* \* \*